CHANCY H. LATHROP.
Improvement in Trucks for Locomotive Engines.
No. 119,857. Patented Oct. 10, 1871.
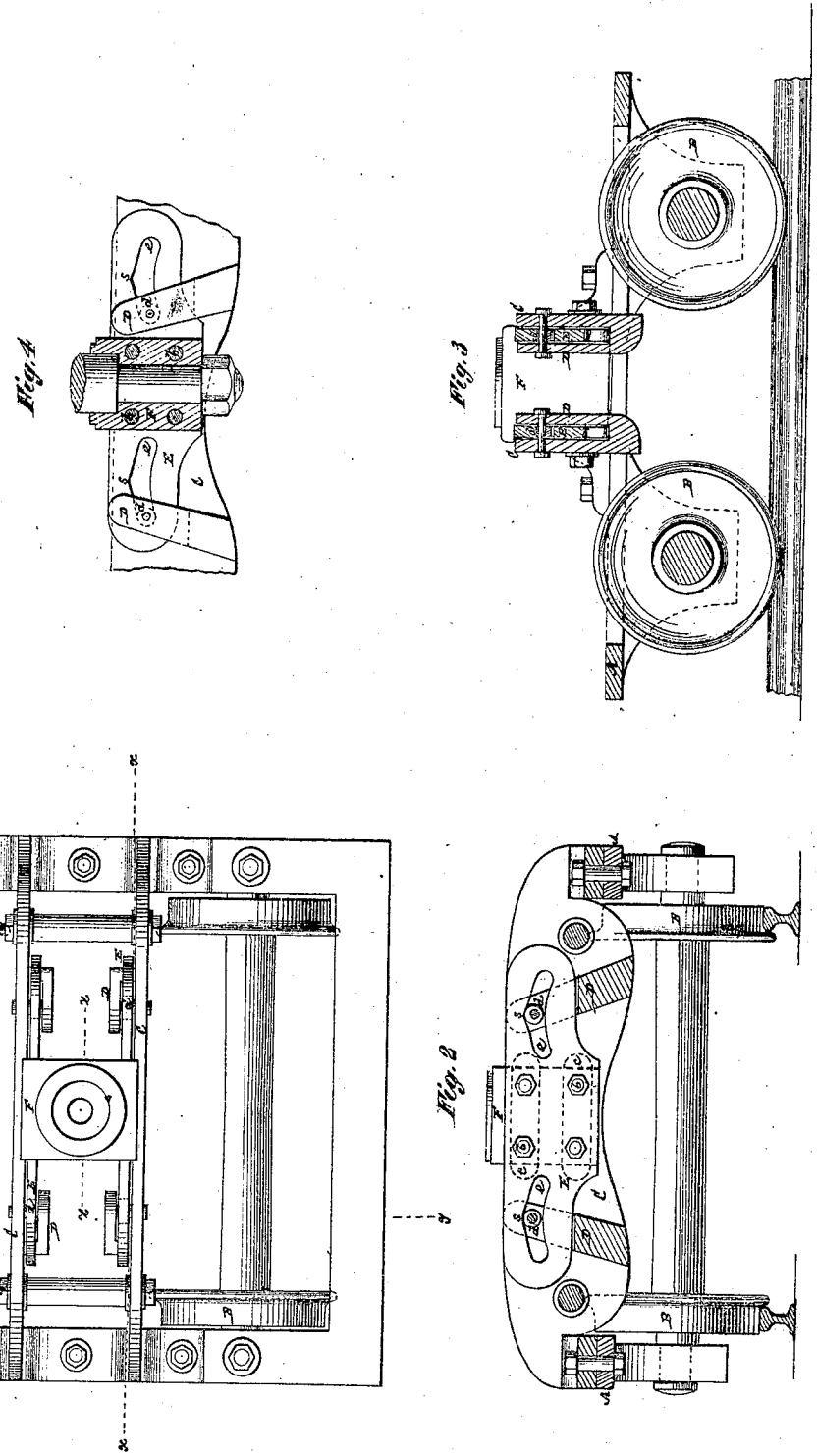
Witnesses
James B. Graham
J. H. Kreeling
Chancy H. Lathrop 119,857

UNITED STATES PATENT OFFICE.

CHANCY H. LATHROP, OF JERSEY CITY, NEW JERSEY.

IMPROVEMENT IN TRUCKS FOR LOCOMOTIVE ENGINES.

Specification forming part of Letters Patent No. 119,857, dated October 10, 1871.

*To all whom it may concern:*

Be it known that I, CHANCY H. LATHROP, of Jersey City, in the county of Hudson and State of New Jersey, have invented a new and useful Improvement in Trucks for Locomotive Engines, of which the following is a full, clear, and exact description, reference being had to the accompanying drawing which forms part of this specification.

This invention relates to means by which provision is made for the lateral movement of the truck under the locomotive in passing round curves on the track, and for automatically centering the truck when moving over straight portions of the track. In carrying out the invention I use a free or loose connection with the frame of the truck, in a lateral direction, of the center block, to which the frame of the locomotive is bolted or attached. The invention comprises a center-block frame, arranged in transverse relation to the truck, and provided with slots at its ends for reception of rollers or supports carried by the truck-frame that thus is made capable of sliding laterally within the slotted portions of the center-box frame, and the slots in the latter being so shaped that said center-box frame is not only self-centering, or rather the truck, under the weight of the locomotive, self-centering on said frame, and the necessary check to a too easy lateral movement of the truck obtained, but also a parallel movement of the truck, when working laterally, relatively to the ends of the center-box frame is effected. By this arrangement a more positive and surer centering of the truck is secured than is obtainable under a tied or jointed attachment of the truck and center-box; also friction is reduced in the lateral movement of the truck and lift of the locomotive at its one side as compared to its other, during such lateral movement, is avoided; likewise provision is made by means of slotted guides carried by the truck-frame and that receive the ends of the center-box frame through them for support of the latter in case of breakage of its ordinary supports; and the several parts or certain of them are so constructed, combined, and fitted as to admit of their ready detachment and removal without removing the locomotive from the truck, or disturbing other than the details requiring replacement.

Having thus specified the object and nature of the invention, its description will be proceeded with in reference to the accompanying drawing. Figure 1 represents a plan of a truck for locomotive-engines constructed in accordance with this invention. Fig. 2 is a transverse section of the same, taken as indicated by the line $x\ x$ in Fig. 1; Fig. 3, a longitudinal vertical section in a plane, as indicated by the line $y\ y$; and Fig. 4, a transverse section, in part, through the line $z\ z$ in Fig. 1.

Similar letters of reference indicate corresponding parts throughout the several figures.

A is the frame of a truck, and B B its wheels. Mounted on said frame so as to vertically form part of it is a central cross-frame, C C, composed for the most part of two parallel cross-pieces or cheeks, arranged at a suitable distance apart to receive the center-box frame in between them. This cross-frame C C or cheeks, of which it is composed, is provided with slotted interior guides D D, arranged in opposite pairs on the two cheeks or cross-pieces upon opposite sides of the center of the truck, to receive in a free or loose manner between them and the cheeks or cross-frame C C the ends of the center-box frame or side pieces E E composing the same. F is the center-box, to which the locomotive frame is pivoted or bolted, and which is attached to the center-box frame or side pieces E E, by means of bolts $b\ b$, entered through slots $c\ c$ in each of the cheeks C C. This mode of attachments facilitates separate detachment of the parts when required, and the side pieces E E of the center-box frame are supported, in case of breakage of its regular supports, by the bottom of the slots in the guides D D. The regular supports of the center-box frame consist of rollers $d\ d$, carried in part by the cheeks C C of the cross-frame of the truck, and in part by the guides D D, which latter on both sides may be set converging toward one another in an upward direction. These rollers are arranged to lie within slots $e\ e$, in both of the side pieces E E of the center-box frame, and carry the weight of the locomotive on the truck by the contact of the rollers with the tops of the slots. Said slots $e\ e$ are, for the most part, of a curved or arched form, but of an inverted V-form above at their centers $s\ s$, which (by the fit of the rollers $d\ d$ in such portions $s\ s$ that occurs when the truck is running on a straight track) insures an automatic and positive or steady centering and hold of the truck, while the remaining or curved portions of the slots *e e* provide for the lateral play of the truck when passing around curves, and aid in the return of the truck toward its central position, the opposite ends of the two side pieces E E rising or falling during such lateral movement in a similar and equal manner, thereby preserving the parallelism of the center-box frame relatively to the locomotive frame which rests upon it.

A free or loose connection of the center box with the truck, as described, is attended with less friction, and has a better centering action, with greater facility for detachment of the parts than a positive or tied and jointed connection working by rods or levers, which, to secure a centering action, have to be set so that when the truck moves laterally the locomotive is lifted on its one side and lowered on its other, a defect that is avoided by the parallel action of the center-box frame in this arrangement.

What is here claimed, and desired to be secured by Letters Patent, is—

1. The center-box frame E E, constructed with curved slots *e e* at its ends of an inverted V-form at their centers *s s* on their upper edges, in combination with the rollers *d d* carried by the cross-frame C C of the truck, within which the center box and its frame are fitted to slide laterally, essentially as shown and described.

2. The combination of the slotted guides D D with the cross-frame C C of the truck, the rollers *d d*, and the self-centering slotted center-box frame, when the whole are constructed and arranged for operation substantially as herein set forth.

CHANCY H. LATHROP.

Witnesses:
   JAMES B. GRAHAM,
   JACOB H. VREELAND. (94)